United States Patent
Liu

(10) Patent No.: US 6,996,874 B2
(45) Date of Patent: Feb. 14, 2006

(54) AIR JET FOR MACHINE TOOL TO CLEAN CUTTING DUST

(75) Inventor: Chun-Nan Liu, Taichung Hsien (TW)

(73) Assignee: QAV Equipment and Tools Inc., Taichung Hsien (TW)

( * ) Notice: Subject to any disclaimer, the term of this patent is extended or adjusted under 35 U.S.C. 154(b) by 419 days.

(21) Appl. No.: 10/438,828

(22) Filed: May 16, 2003

(65) Prior Publication Data

US 2004/0205924 A1    Oct. 21, 2004

(51) Int. Cl.
   *A47L 5/20* (2006.01)
   *B25F 3/00* (2006.01)
   *B26D 7/18* (2006.01)

(52) U.S. Cl. .......................... 15/301; 15/341; 15/344; 15/405; 30/123.3; 30/388; 83/98; 83/99

(58) Field of Classification Search ............... 15/246.2, 15/300.1, 301, 316.1, 339, 344, 405, 406, 15/341; 30/123.3, 388; 83/98, 99; 451/415, 451/449, 451
   See application file for complete search history.

(56) References Cited

U.S. PATENT DOCUMENTS

| | | | | |
|---|---|---|---|---|
| 956,100 | A * | 4/1910 | Hutchinson | 15/341 |
| 1,034,597 | A * | 8/1912 | Duryea | 55/469 |
| 1,105,942 | A * | 8/1914 | Waring | 92/37 |
| 1,212,815 | A * | 1/1917 | Roth | 15/344 |
| 1,708,345 | A * | 4/1929 | Wodack et al. | 30/377 |
| 1,833,785 | A * | 11/1931 | Krieger | 83/98 |
| 2,378,347 | A * | 6/1945 | Williams | 15/341 |
| 2,631,619 | A * | 3/1953 | Folli | 83/98 |
| 3,162,371 | A * | 12/1964 | Palmer et al. | 239/327 |
| 3,822,035 | A * | 7/1974 | Kopernak | 228/20.5 |
| 3,863,453 | A * | 2/1975 | Mercier | 60/539 |
| 4,094,031 | A * | 6/1978 | Cellini | 15/1.7 |
| 4,206,864 | A * | 6/1980 | Rauchwerger | 228/20.5 |
| 4,870,755 | A * | 10/1989 | Schnizler | 30/123.3 |
| 4,993,293 | A * | 2/1991 | Christoffersson et al. | 83/98 |
| 5,084,971 | A * | 2/1992 | Remington et al. | 30/123 |
| 5,199,174 | A * | 4/1993 | Wild | 30/123.3 |
| 5,479,709 | A * | 1/1996 | Lai | 30/123.3 |
| 6,024,678 | A * | 2/2000 | Solomon | 482/111 |
| 6,076,443 | A * | 6/2000 | Theising et al. | 83/98 |

* cited by examiner

*Primary Examiner*—Terrence R. Till
(74) *Attorney, Agent, or Firm*—Browdy and Neimark, PLLC

(57) ABSTRACT

An air jet for a machine tool to clean cutting dust has a housing with a hole and an outlet. An eccentric member has a cam and is provided in the housing which the eccentric member is driven by a power resource of the machine tool for rotation. An annular transmission is engaged with the eccentric member. A driving member is driven by the transmission for linear reciprocating motion. A flexible film is provided in the housing covering the outlet and has an inlet corresponding to the driving member, wherein the inlet of the film is sealed and the film is pressed for strain while the driving member is moved toward the film, and a tube has an end thereof connected with the outlet.

4 Claims, 3 Drawing Sheets

AIR JET FOR MACHINE TOOL TO CLEAN CUTTING DUST

BACKGROUND OF THE INVENTION

1. Field of the Invention

The present invention relates generally to a machine tool such as a hand saw machine or a circular saw machine, and more particularly to an air jet for a machine tool to clean cutting dust.

2. Description of the Related Art

A conventional machine tool for sawing process had a saw on a table and was driven by a motor. An object was put on the table and cut by the saw. There were always dust generated while the saw of the machine tool was cutting objects and the dust were accumulated at where the object is cut that make the operator is hard to identify the correct path of the object supposed to be cut. So, operator had to blow the dust away to identify the correct path frequently.

No matter what ways of cleaning the cutting dust, such as blow the dust away or stop the cutting work to brush the dust away, they might cause danger to operator or slow down the work efficiency.

SUMMARY OF THE INVENTION

The primary objective of the present invention is to provide an air jet, which is driven by a power resource of the machine tool directly to jet out air flow continuously to the position of the cutting tool of the machine tool cutting an object to clean the cutting dust.

According to the objective of the present invention, an air jet for a machine tool to clean cutting dust, wherein the machine tool has a cutting tool and a power resource to drive the machine working, comprises a housing having a hole and an outlet. An eccentric member is provided in the housing corresponding to the hole. The eccentric member is driven by the power resource of the machine tool for rotation. The eccentric member has a cam. An annular transmission is engaged with the eccentric member and is driven by the cam. A driving member is provided in the housing between the outlet and the transmission and is driven by the transmission for linear reciprocating motion. A flexible film is provided in the housing covering the outlet and has an inlet corresponding to the driving member, wherein the inlet of the film is sealed and the film is pressed for strain while the driving member is moved toward the film, and a tube has an end thereof connected with the outlet.

DETAILED DESCRIPTION OF THE INVENTION

Figure 1:
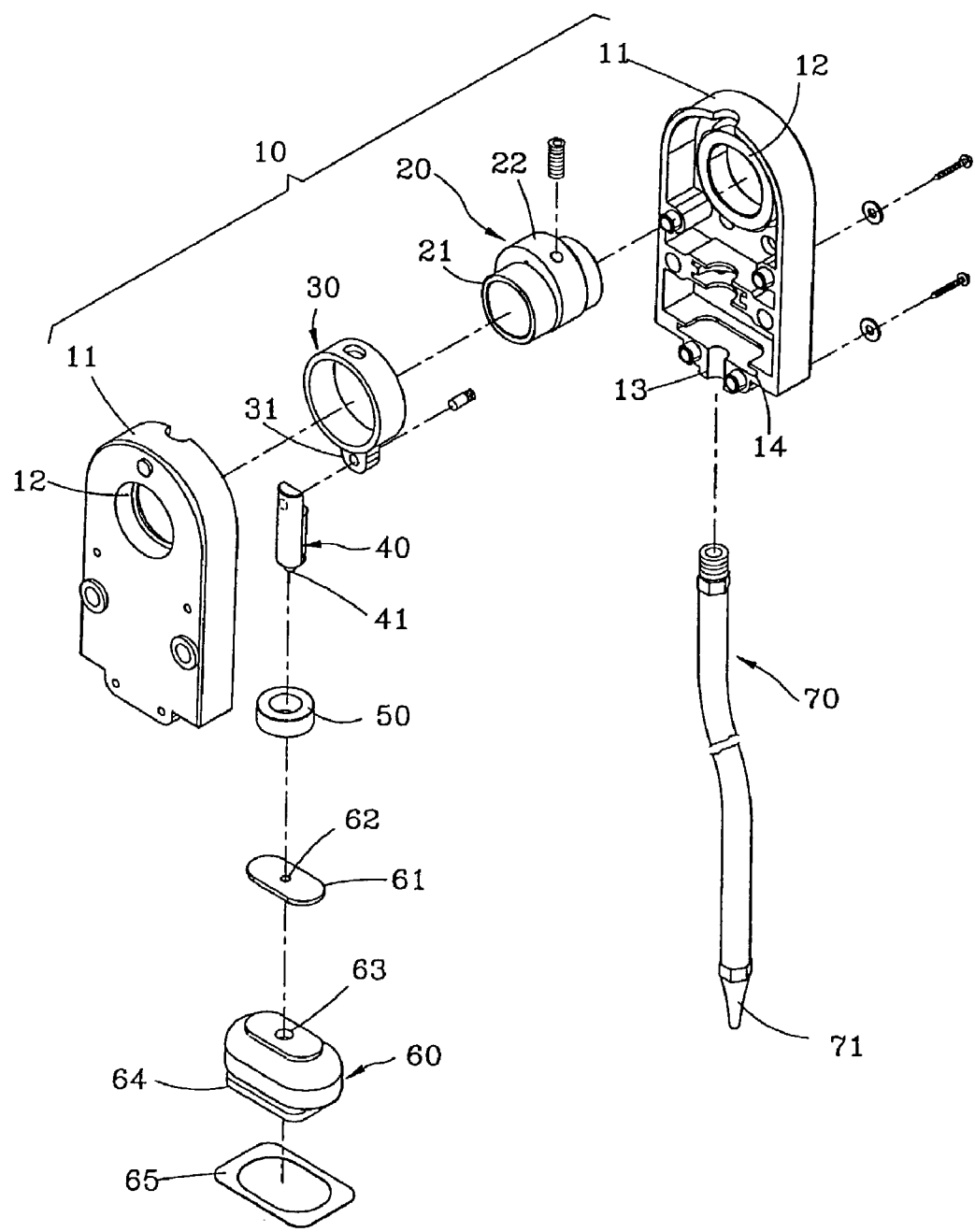
FIG. 1 is an exploded view of a preferred embodiment of the present invention.
Figure 2:
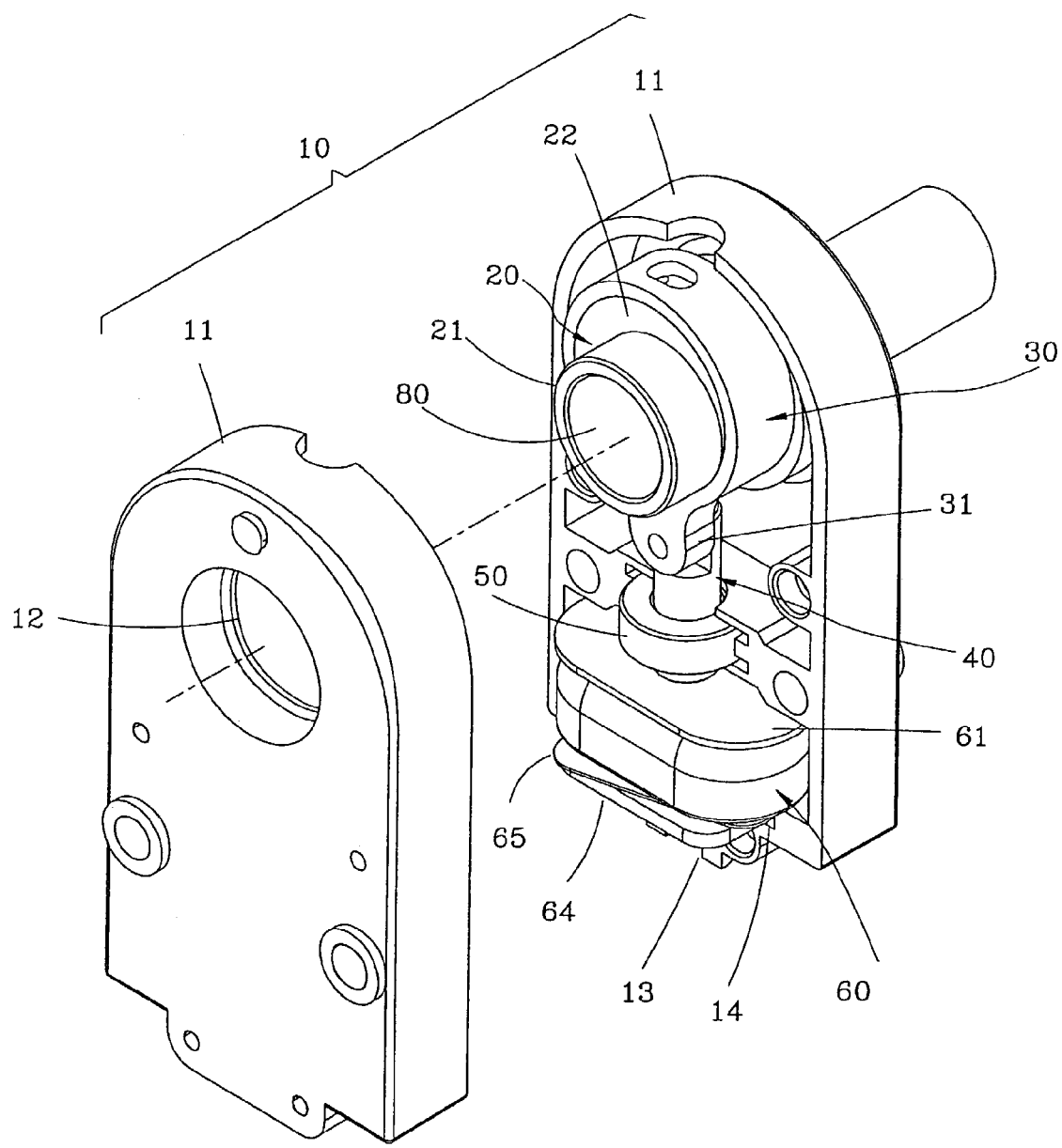
FIG. 2 is a perspective view of the preferred embodiment of the present invention.
Figure 3:
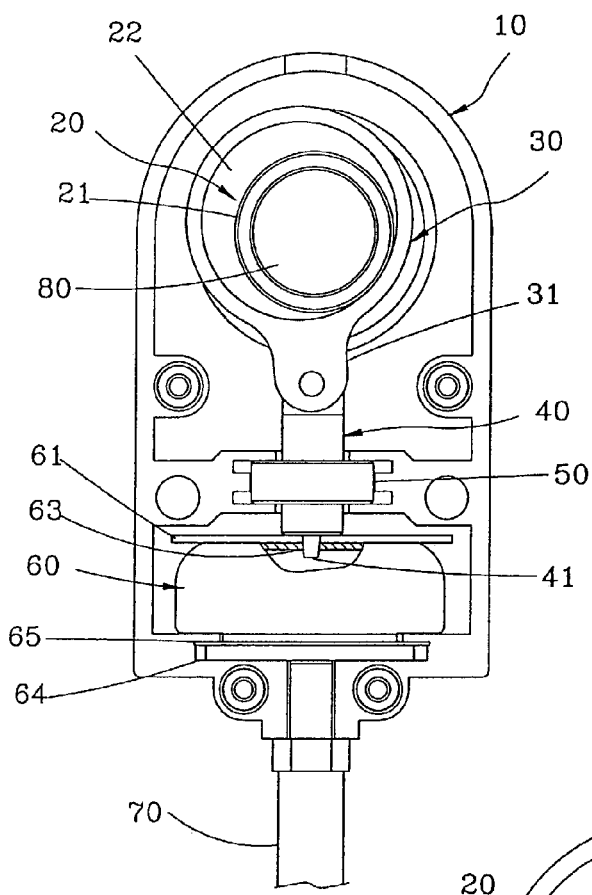
FIG. 3 is a front view of the preferred embodiment of the present invention.
Figure 4:
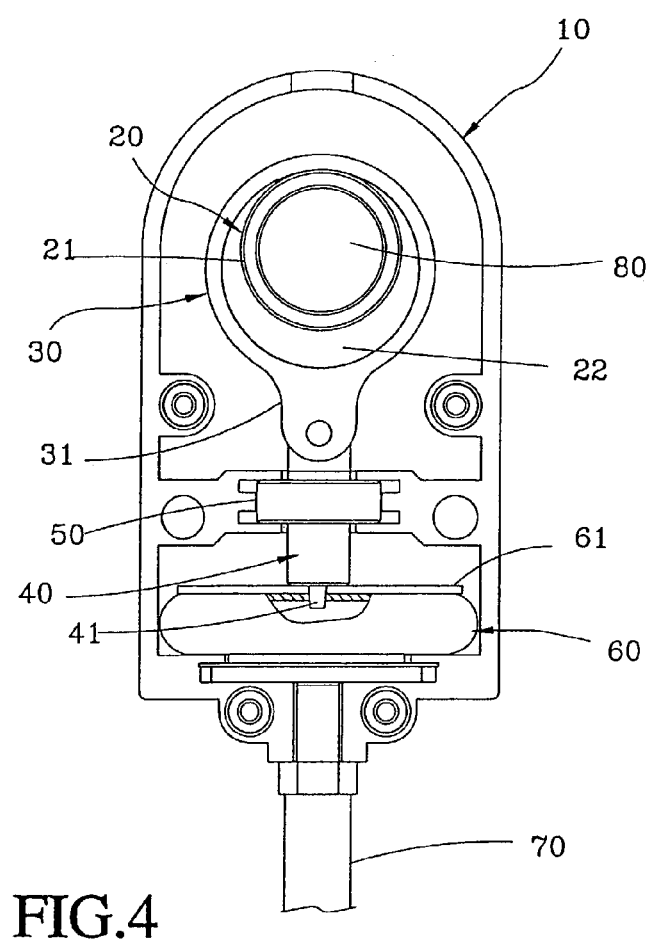
FIG. 4 is similar to FIG. 3, showing the flexible film strained.

As shown in FIG. 1 and FIG. 2, an air jet for a machine tool to blow dust away comprises the following elements.

A housing 10 consists of two casings 11 having a convex end at a top thereof. The housing 10 has a hole 12 adjacent to the convex end and through the housing 10 and has an outlet 13 at a bottom thereof. The housing 10 further has a slot 14 at an interior side of the bottom thereof communicated with the outlet 13.

An eccentric member 20 is provided in the housing 10 having a connection portion 21 at a center thereof and a cam 22 around the connection portion 21. The connection portion 21 is not at a center of the cam 22. The connection portion 21 is a tube-like element in the present preferred embodiment to be inserted into the hole 12 of the housing 10 and a shaft 80 is inserted into the connection portion 21 to pivot the eccentric member 20 on the housing 10. The eccentric member 20 is driven by the shaft 80 for rotation.

A transmission 30 is a round ring and is engaged with the cam 22 of the eccentric member 20. The transmission 30 has a pivoting portion 31 at an outer surface thereof.

A driving member 40 is a shaft provide in the housing 10 at where below the transmission 30. The driving member 40 has an end thereof pivoted on the pivoting portion 31 of the transmission 30 and the other end thereof having a post 41 that has an axis as same as an axis of the driving member 40 and faces the outlet 13 of the housing 10.

A bearing 50 is fixed in the housing 10 below the transmission 40. The bearing 50 is engaged with the driving member 40 so that the driving member 40 is limited for linear motion along a hole of the bearing 50.

A flexible film 60, which is made of rubber, is arranged in the housing 10 between the outlet 13 and the driving member 40. The film 60 covers the outlet 13. An elliptic pad 61 having a hole 62 is provided at between the film 60 and the driving member 40. The film 60 has an inlet 63 corresponding to the hole 62 of the pad 61. The post 41 of the driving member 40 is inserted into the hole 62 and inlet 63 that makes the driving member 40 against the pad 61 and sealing the inlet 63. The film 60 further has an engagement portion 64 at a bottom thereof to be engaged with the slot 14 of the housing 10. A harden ring 65 is provided at between the engagement portion 64 and the slot 14 to prevent the engagement portion 64 from escape.

A tube 70, which is made of a flexible material such as rubber, has an end thereof connected with the outlet 13 and the other end thereof connected with a nozzle 71. The nozzle 71 is arranged at where adjacent to a cutting tool (such as a saw) of the machine tool.

The air jet of the present invention is driven by a motor of a power resource of the machine tool where the air jet is mounted. The motor drives the shaft 80 rotating and to drive the cam 21 of the eccentric member 20 rotating in an eccentric condition. The transmission 30 is driven by the eccentric member 20 to swing and the driving member 40, therefore, is driven by the transmission 30 for linear reciprocating motion.

While the driving member 40 is moved downward, the post 41 is inserted into the hole 62 of the pad 61 and the inlet 63 of the film 60. The inlet 63 now is sealed. The film 60 is pressed by the pad 61 for strain while the driving member 40 is moved downward continuously and makes the air within film 60 flowing out of the housing 10 via the outlet 13. The air flow through the tube 70 and is jetted out via the nozzle 71 to blow cutting dust away.

While the driving member 40 is moved upward, the film 60 recovers its initial shape and while the driving member 40 is moved to a top position, it leaves the film 60 for suction air into the film 60 via the inlet 63.

The air jet of the present invention, thus, is driven by the power resource of the machine tool directly to continuously blow the cutting dust away in the cutting process and the work efficiency will be raised therefore.

What is claimed is:

1. An air jet for a machine tool to clean cutting dust, wherein the machine tool has a cutting tool and a power resource to drive the machine working, comprising:
    a housing having a hole and an outlet;
    an eccentric member provided in the housing corresponding to the hole, wherein the eccentric member is driven by the power resource of the machine tool for rotation; the eccentric member having a cam;
    an annular transmission engaged with the eccentric member and driven by the cam;
    a driving member provided in the housing between the outlet and the transmission and driven by the transmission for linear reciprocating motion;
    a flexible film provided in the housing covering the outlet and having an inlet corresponding to the driving member;
    wherein the inlet of the film is sealed and the film is pressed for strain while the driving member is moved toward the film, and
    a tube having an end thereof connected with the outlet.

2. The air jet as defined in claim 1, wherein the eccentric member has a connection portion, which is a tube-like element, to be connected with the power resource.

3. The air jet as defined in claim 1, further comprising a bearing fixed in the housing, wherein the driving member runs through the bearing and the bearing limits the driving member for linear motion.

4. The air jet as defined in claim 1, further comprising a pad provided in the housing between the driving member and the film, wherein the pad has a hole at a center thereof and the driving member has a post inserted into the hole of the pad and the inlet of the film.

\* \* \* \* \*